(12) United States Patent
Lupyrypa

(10) Patent No.: US 6,312,058 B1
(45) Date of Patent: Nov. 6, 2001

(54) CENTERING THE RIM OF A WHEEL ON ITS SUPPORTING HUB

(76) Inventor: Raymond L. Lupyrypa, Box 54, Stony Mountain, Manitoba (CA), R0C 3A0

( * ) Notice: Subject to any disclaimer, the term of this patent is extended or adjusted under 35 U.S.C. 154(b) by 0 days.

(21) Appl. No.: 09/544,270

(22) Filed: Apr. 6, 2000

Related U.S. Application Data
(60) Provisional application No. 60/129,039, filed on Apr. 13, 1999.

(51) Int. Cl.$^7$ ............................................. B60B 1/00
(52) U.S. Cl. ........................ 301/35.62; 301/111; 29/273
(58) Field of Search ........................... 301/35.62, 105.1, 301/111; 29/273

(56) References Cited

U.S. PATENT DOCUMENTS

| | | | |
|---|---|---|---|
| 2,533,707 | * 12/1950 | Ash | 301/35.62 |
| 3,649,079 | * 3/1972 | English | 301/35.62 |
| 3,960,047 | * 6/1976 | Liffick | 301/35.62 |
| 4,708,397 | * 11/1987 | Weinmann | 301/35.62 |

FOREIGN PATENT DOCUMENTS

2508057 * 9/1976 (DE) .

* cited by examiner

Primary Examiner—Russell D. Stormer
(74) Attorney, Agent, or Firm—Adrian D. Battison; Michael R. Williams

(57) ABSTRACT

A method of centering a wheel rim on a wheel hub of a vehicle is provided where the hub includes a center projection arranged to engage a central hole in the rim to effect a centering action and a plurality of threaded wheel support studs carried on the hub in a pattern surrounding a central axis of the hub. The method includes providing three or four female threaded fasteners each for engaging onto a respective one of the studs for clamping the rim to the hub. Each fastener has an integral body defining a sleeve portion and a nut portion with a female thread through a central bore. The sleeve portion is inserted between the cylindrical inner surface and the threaded portion of the stud as a sliding fit inside the cylindrical inner surface so as to accurately locate the hole relative to the stud for centering the rim on the hub and the nut portion clamps the rim to the hub. The fasteners are spaced angularly around the hub and conventional nuts are engaged onto the remaining studs to hold the rim in place. When held the centering fasteners can be removed.

6 Claims, 1 Drawing Sheet

CENTERING THE RIM OF A WHEEL ON ITS SUPPORTING HUB

This application claims priority under 35 U.S.C. 119 from Provisional Application No. 60/129,039 filed Apr. 13, 1999.

This invention relates to an apparatus and method for use in centering a wheel on its supporting hub.

BACKGROUND OF THE INVENTION

The vehicle wheels and particularly those for highway trucks require to be carefully and accurately attached to the hub so that they properly rotate around the central axis of the hub.

Recent redesigns in the conventionally available hub and wheel construction utilize a central projecting portion from the hub which enters into a central receptacle or hole in the wheel. The wheel is received onto a plurality of studs with each stud co-operating with a respective hole in the wheel. The recent designs have however provided sufficient clearance between the stud and the hole in the wheel so that some movement can occur thus allowing a centering action defined by the projecting portion in the central hole.

However the present inventor has found that these arrangements are unsatisfactory and that the wheels are often mounted off center so that they are out of balance.

SUMMARY OF THE INVENTION

It is one object of the present invention, therefore to provide an improved method arranged for providing an improved centering of the rim on the hub.

According to one aspect of the invention there is provided a method of centering a wheel rim on a wheel hub of a vehicle comprising:

the wheel hub having a plurality of wheel support studs carried on the hub in a pattern surrounding a central axis of the hub, each stud having a male screw thread thereon extending from an outer end thereof at least partly toward the hub;

the wheel having a central disk portion for mounting on the hub and a surrounding rim portion for carrying a tire on the rim for rotation around the axis on the rim and the hub;

the wheel having a plurality of holes through the disk portion from an outer surface of the rim to an inner surface thereof, each hole defining a cylindrical hole surface for receiving therethrough and surrounding a respective one of the studs;

the method comprising providing at least three female threaded fasteners each for engaging onto a respective one of the studs for clamping the wheel to the hub each having a sleeve portion and a nut portion;

inserting the sleeve portion between the cylindrical inner surface and the threaded portion of the stud as a sliding fit inside the cylindrical inner surface so as to accurately locate the hole relative to the stud for centering the wheel on the hub;

and engaging a female thread of the nut portion onto the threaded portion of the stud to engage the outer surface of the wheel to clamp the wheel to the hub;

the at least three fasteners being spaced angularly around the hub;

and, with the wheel so centered, engaging conventional nuts onto the remaining studs to hold the wheel in place.

The fasteners can be removed after the rim is held in place by the conventional nuts and are replaced by conventional nuts.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 2:
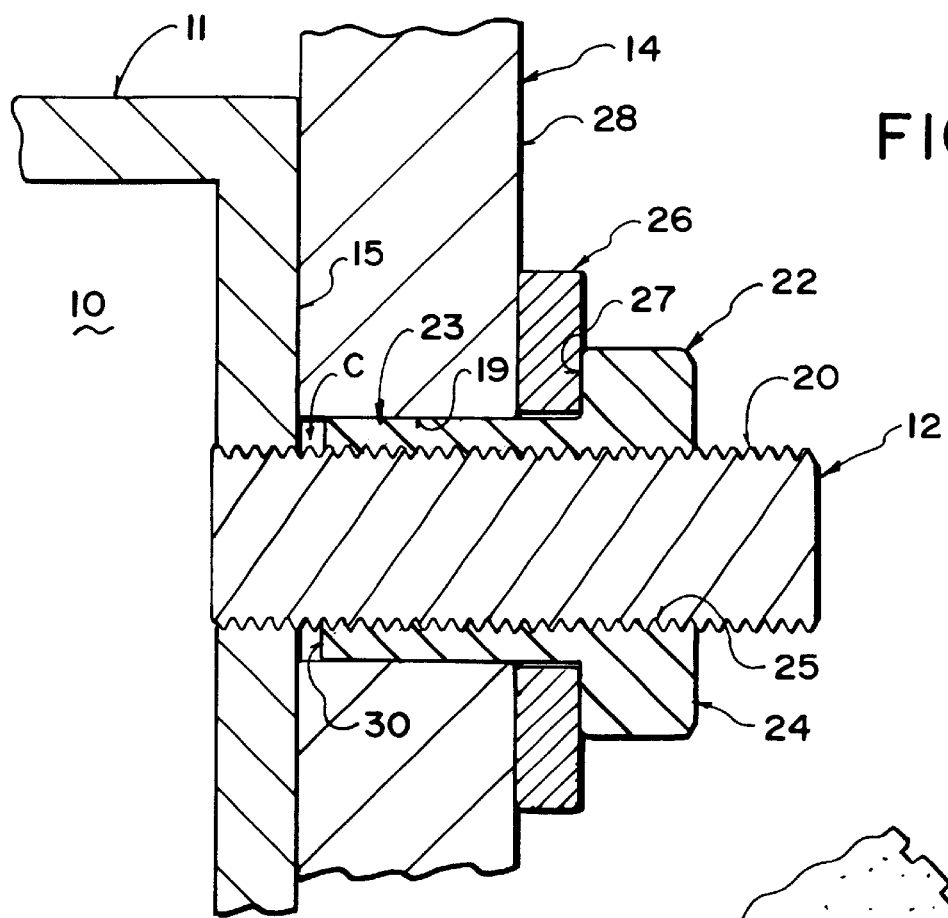
FIG. 2 is a vertical cross-sectional view along the lines 2—2 of FIG. 1.
Figure 1:
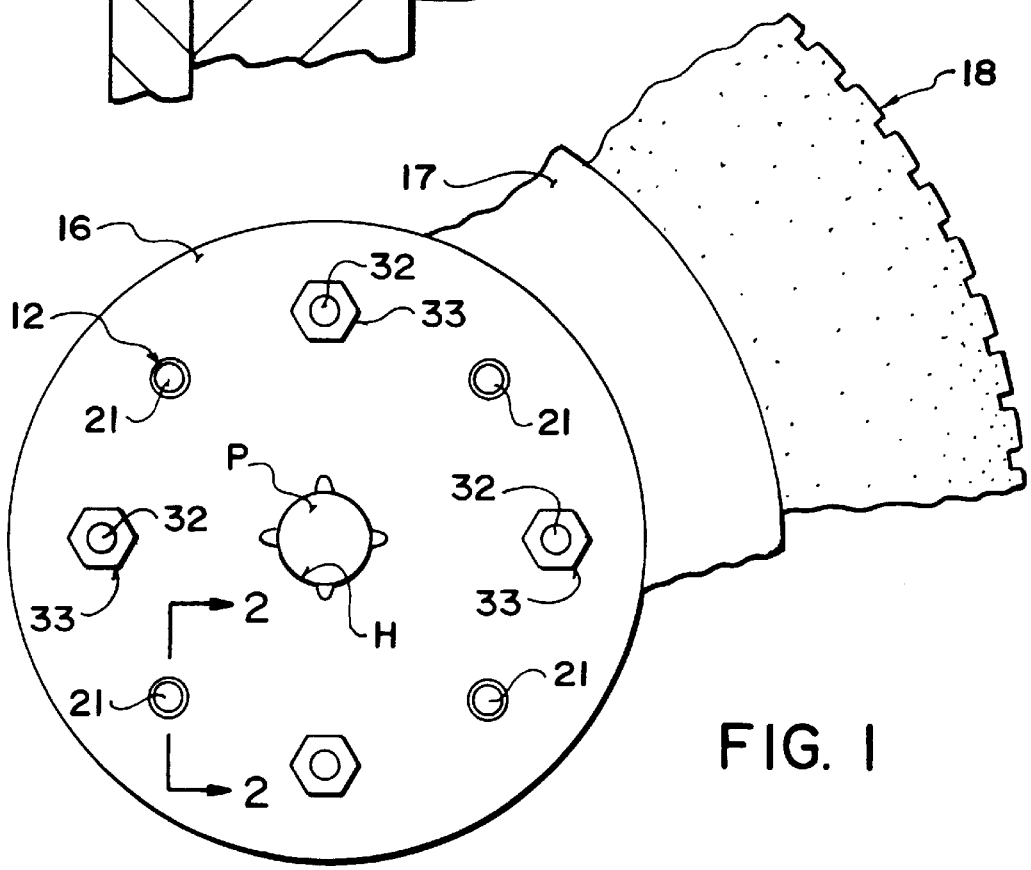
FIG. 1 is a front elevational view of wheel and wheel hub assembly according to the present invention.

A wheel assembly for a vehicle particularly but not exclusively a highway truck comprises a wheel hub 10 which carries a conventional brake drum 11. The hub 10 has a plurality of studs 12 projecting outwardly therefrom through the brake drum so that a wheel 14 can be clamped to the outside surface 15 of the hub, that is the brake drum, by a conventional nut applied onto the outside male thread of the stud 12. The wheel includes a central disc portion 16, an outer rim portion 17 on which is mounted a tire 18.

The wheel 14 has a plurality of holes 19 each for receiving a respective one of the studs. The hole 19 defines an inner hole surface which has a clearance C between the hole surface and the outside thread 20 of the stud 12.

According to the present invention, three or four of the studs as indicated at 21 have mounted on those studs a centering fastener 22. This comprises a sleeve portion 23 and a nut portion 24. These are preferably formed as an integral construction with a common longitudinal female thread extending through a central bore 25 of the sleeve and nut. The female thread is arranged to engage onto the male thread 20 of the stud. An outside surface of the sleeve portion is a sliding fit within the inside surface 19 of the hole. A washer 26 is provided between an end shoulder 27 of the nut and the outside surface 28 of the wheel. An end face 30 of the sleeve portion is spaced outwardly from the outside surface 15 of the hub.

In use, the centering fasteners 22 are used on the studs 21 to locate the wheel on the hub thus supplementing the centralizing effect of the central projection.

P of the hub through a central hole H of the rim. The fasteners 22 are therefore screwed into place on the studs and the sliding effect of the outside surface of the sleeve portion locates each of the holes properly on the stud. When so clamped into place the remaining studs 32 have applied thereto conventional nuts 33 which clamp the wheel to the hub in its centralized position. In this position the fasteners 22 can remain in place and can be torqued down to the required clamping action or they can be removed and replaced by conventional nuts. The use of three or four of the centering fasteners ensures that an effective centralizing effect is applied. The centering fasteners 22 overcome or supersede the inadequate centering effect of the projection P.

Although preferably the sleeve and the nut are integral, separate elements can be provided to effect the same function. The sleeve can be smooth on its inner surface as a sliding fit on the outside of the thread of the stud.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A method of centering a wheel on a wheel hub of a vehicle the wheel hub having a plurality of wheel support studs carried on the hub in a pattern surrounding a central axis of the hub, each stud having a male screw thread thereon extending from an outer end thereof at least partly toward the hub;

the wheel having a central disk portion for mounting on the hub and a surrounding rim portion for carrying a tire on the rim portion for rotation around the axis on the rim portion and the hub;

the central disk portion having a plurality of holes therethrough from an outer surface to an inner surface thereof, each hole defining a cylindrical hole surface for receiving therethrough and surrounding a respective one of the studs;

the method comprising:

providing at least three female threaded fasteners each for engaging onto a respective one of the studs for clamping the central disk portion to the hub each having a sleeve portion and a nut portion;

inserting the sleeve portion between the cylindrical inner surface and the threaded portion of the stud as a sliding fit inside the cylindrical inner surface so as to accurately locate the hole relative to the stud for centering the central disk portion on the hub;

engaging a female thread of the nut portion onto the threaded portion of the stud to engage the outer surface of the central disk portion to clamp the central disk portion to the hub;

the at least three fasteners being spaced angularly around the hub;

with the central disk portion so centered, engaging conventional nuts onto the remaining studs to hold the rim in place;

removing the fasteners after the central disk portion is held in place by the conventional nuts;

and replacing the fasteners with conventional nuts.

2. The method according to claim 1 wherein the sleeve portion has a female thread.

3. The method according to claim 1 wherein the sleeve portion and the nut portion are integral with the female thread passing fully therethrough.

4. The method according to claim 1 wherein the sleeve portion has a length sufficient to extend substantially but not wholly to the hub.

5. The method according to claim 1 wherein there is provided a washer between the nut portion and the outer face of the central disk portion.

6. The method according to claim 1 wherein the hub has a centering projecting portion extending outwardly therefrom and the central disk portion has a receptacle for the projecting portion arranged with the intention of centering the central disk portion on the hub.

* * * * *